United States Patent [19]

Pierson

[11] 4,090,003
[45] May 16, 1978

[54] RECORDING TAPE APPLICATOR

[75] Inventor: Robert B. Pierson, Webster, N.Y.

[73] Assignee: Tapecon, Inc., Rochester, N.Y.

[21] Appl. No.: 803,370

[22] Filed: Jun. 3, 1977

[51] Int. Cl.² ............................ B32B 7/06; G11B 5/84
[52] U.S. Cl. ........................................ 428/42; 40/541;
156/233; 156/249; 156/538; 352/37; 360/2;
427/128; 428/900; 428/914
[58] Field of Search ............... 156/537, 538, 249, 239,
156/233; 428/40–42, 900, 914; 96/43; 40/125
A, 2 R; 427/128–132, 147; 360/2, 131; 352/37, 27

[56] References Cited

U.S. PATENT DOCUMENTS

| 3,166,186 | 1/1965 | Karn | 428/42 |
| 3,315,387 | 4/1967 | Heuser | 428/41 X |
| 3,761,344 | 9/1973 | Mrozek et al. | 428/41 |
| 3,821,060 | 6/1974 | Braca et al. | 428/900 X |
| 3,838,252 | 9/1974 | Hynes et al. | 360/2 X |
| 3,914,891 | 10/1975 | Brewer | 40/125 A |
| 3,932,253 | 1/1976 | Elarde et al. | 156/249 |
| 3,975,574 | 8/1976 | Saluke | 428/900 X |
| 4,015,352 | 4/1977 | Prange | 428/41 X |

Primary Examiner—David Klein
Assistant Examiner—Thomas Bokan
Attorney, Agent, or Firm—Stonebraker, Shepard & Stephens

[57] ABSTRACT

A recording tape applicator has a card with an edge forming an abutment surface, a release sheet secured to the card and extending outward beyond the abutment surface, and a strip of magnetic recording tape adhesively supported by the release sheet on the side opposite the card. The recording tape is spaced from and accurately parallel with the abutment surface of the card, and the release sheet has a slit extending longitudinally along the middle of the recording tape so that an outer portion of the release sheet can be removed to expose about half of the tape. The card is then abutted against an object, and the tape is pressed against a face surface of the object to align the tape accurately with the edge of the object. Then the card and the remaining release sheet is pulled away from the tape, and the whole tape is pressed against the object and trimmed if necessary.

6 Claims, 8 Drawing Figures

RECORDING TAPE APPLICATOR

BACKGROUND OF THE INVENTION

Tape recorders for recording and playing back from magnetic recording tapes secured to cards or photographs are becoming increasingly popular. Many systems using recording strips on flat cards have the strips accurately mounted in factory assembly operations, but an increasing variety of uses requires the consumer to mount magnetic recording strips on photographs or cards by manual operations. For such mounts to work properly in existing equipment, the magnetic recording strips must be accurately spaced from and parallel with a bottom edge of the card or photograph, and inaccurate mounting of the recording strip can spoil the desired effect.

The invention involves recognition of the problem of accurately mounting magnetic recording strips on photographs and cards by manual operations so that the strips are suitably positioned for recording and playing back sounds, and solves this problem in a simple, economical, reliable, and efficient way. The invention aims at easy, quick, and accurate mounting of recording strips on photographs and cards by manual steps performable at home.

SUMMARY OF THE INVENTION

The inventive recording tape applicator includes a card having an edge forming an abutment surface, a release sheet secured to the card and extending outward beyond the abutment surface, and a strip of magnetic recording tape adhesively supported by the release sheet on the side of the release sheeet opposite the card. The recording tape is positioned outward from and accurately parallel with the abutment surface of the card, and the release sheet has a slit extending for the length of the recording tape along a midregion of the recording tape to allow removal of an outer portion of the release sheet separated from the remainder of the release sheet along the slit. This exposes an outer portion of the recording tape for adhesively securing the tape to an object while the tape is supported by the remainder of the release sheet for positioning the tape parallel with an edge of the object abutted against the abutment surface. After the exposed portion of the tape is pressed into place against a face surface of the object, the card and the remainder of the release sheet are pulled away from the tape, and the remainder of the tape is pressed against the object for fully securing the tape in place. The results are accurate spacing and parallel alignment of the recording tape relative to the edge of the object that is butted against the abutment surface of the card. Any overhanging tape is trimmed at the edges of the object, and the assembly is ready for recording.

DRAWINGS

DETAILED DESCRIPTION

The invention applies to an applicator and a method for mounting a magnetic recording tape on an object. The object 10 is ordinarily a photograph, but can also be any of a variety of generally plane objects having a card-like form suitable for movement through recording equipment for cards. The invention applies to home or amateur mounting of magnetic recording strips on such objects 10 by a manual method.

Figure 1:
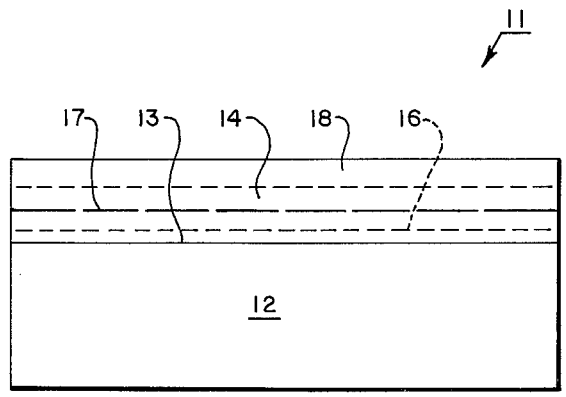
FIG. 1 is a plan view of a preferred embodiment of the inventive applicator.
Figure 2:
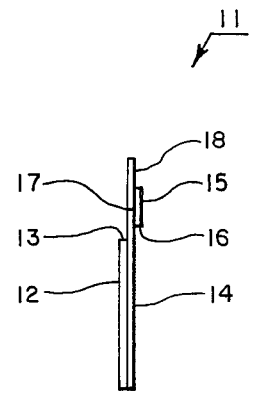
FIG. 2 is a side elevational view of the applicator of FIG. 1.
Figure 3:
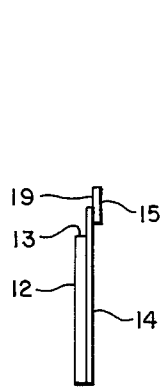
FIG. 3 is a side elevational view of the inventive applicator with the outer portion of the release sheet removed.

The inventive applicator 11 is best shown in FIGS. 1 and 2. It includes a card 12 having a preferably linear edge 13 forming an abutment surface. Card 12 is preferably formed of heavy paper or card stock, although other materials can be used. A release sheet 14 is secured to one face of card 12 and extends outward beyond abutment surface 13. A strip of magnetic recording tape 15 is adhesively supported on the outwardly extending portion of release sheet 14 on the opposite side of release sheet 14 from card 12 as illustrated. Recording tape 15 is preferably coated with a pressure-sensitive adhesive that supports it on release sheet 14 and ultimately secures it to object 10.

The edge 16 of recording tape 15 that is closest to card 12 is accurately spaced a predetermined distance from abutment surface 13 and is accurately parallel with abutment surface 13 to insure generally accurate parallelism and spacing between recording tape 15 and abutment surface 13 of card 12. This relationship insures accurate positioning of recording tape 15 relative to the edge of an object as explained more fully below.

Release sheet 14 has a slit that is preferably formed as a perforation line 17 extending along the length of recording tape 15 and along a middle or midregion of tape 15. Slit 17 is preferably centered along the length of tape 15, and release sheet 14 preferably has a portion 18 extending from slit 17 outward beyond tape 15. Release sheet 14 is separable along slit 17 into outer portion 18 overlying the outer half of tape 15, and an inner portion covering the inner half of tape 15 and secured to card 12.

FIGS. 3-8 show how applicator 11 is used according to the inventive method. First, the outer portion 18 of release sheet 14 is removed by peeling away the outer half of tape 15 to separate the release sheet along slit 17. This exposes an outer portion 19 of tape 15, and since tape 15 is coated with pressure-sensitive adhesive, exposed outer portion 19 is securable to object 10.

Figure 4:
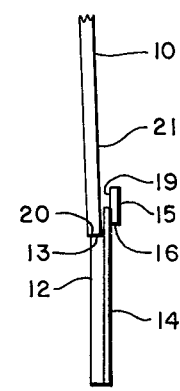
FIGS. 4-7 are fragmentary, side elevational views of the steps subsequent to the step of FIG. 3 for using the inventive applicator to mount a recording tape on an object.
Figure 5:
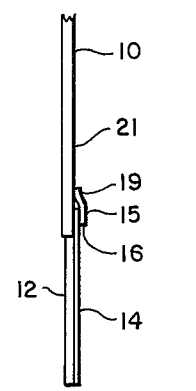

To accomplish this, card 12 and object 10 are moved into an abutting relation as shown in FIGS. 4 and 5 with a lower edge 20 of object 10 engaging abutment surface 13 of card 12. This disposes tape 15 adjacent a face surface 21 of object 10 as shown in FIG. 4, and tape 15 is pressed against face surface 21 for adhesively securing outer portion 19 of tape 15 against object 10.

Figure 6:
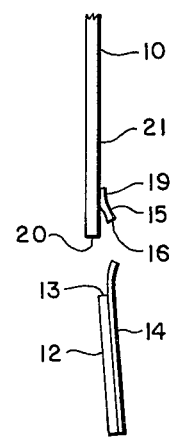
Figure 7:
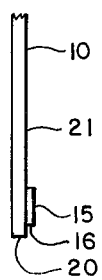
Figure 8:
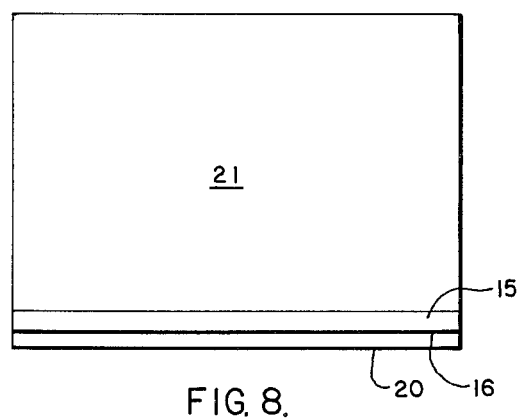
FIG. 8 is a fragmentary plan view of a recording tape mounted on an object.

Then card 12 and the remainder of release sheet 14 are pulled away from tape 15 as shown in FIG. 6 to remove release sheet 14 out from between tape 15 and object 10. Then tape 15 is pressed fully against face surface 21 of object 10 for adhesively securing the full width of tape 15 to object 10. In the completed mount as shown in FIG. 8, tape 15 has its lower edge 16 accurately spaced from edge 20 of object 10 and tape 15 is generally parallel with edge 20 for functioning reliably in card recording equipment.

Applicator 11 not only facilitates accurate mounting of tape 15 on object 10, but also has marketing advantages in that it provides a protective release sheet for tape 15 and allows mounting instructions to be printed on the face of card 12. Recording strips 15 are easier to handle when supported and protected by card 12 and release sheet 14, and applicator 11 effectively serves as a protective packaging device, an accurate mounting tool, and as a communication device for mounting instructions. Also, applicator 11 is simple, economical, and reduces failures and mishaps to make manual mounting of recording tapes on objects an easy and reliable operation.

What is claimed is:

1. A recording tape applicator comprising:
    a. a card having an edge forming an abutment surface;
    b. a release sheet secured to said card and extending outward beyond said abutment surface;
    c. a strip of magnetic recording tape adhesively supported by said release sheet on the side of said release sheet opposite said card;
    d. said recording tape being positioned outward from and accurately parallel with said abutment surface; and
    e. said release sheet having a slit extending for the length of said recording tape along a midregion of said recording tape to allow removal of an outer portion of said release sheet along said slit to expose an outer portion of said recording tape for adhesively securing said tape to an object while said tape is supported by said remainder of said release sheet for positioning said tape parallel with an edge of said object butted against said abutment surface.

2. The applicator of claim 1 wherein said slit is formed as a line of perforations.

3. The applicator of claim 1 wherein said outer portion of said release sheet extends outward beyond said recording tape.

4. The applicator of claim 1 wherein said abutment surface is linear and an edge of said recording tape closest to said card is spaced from and parallel with said abutment surface.

5. The applicator of claim 4 wherein said outer portion of said release sheet extends outward beyond said recording tape.

6. The applicator of claim 5 wherein said slit is formed as a line of perforations.

* * * * *